United States Patent

Clemmons, II et al.

(10) Patent No.: US 7,587,588 B2
(45) Date of Patent: Sep. 8, 2009

(54) SYSTEM AND METHOD FOR CONTROLLING NETWORK ACCESS

(75) Inventors: Merlon Odell Clemmons, II, Coppell, TX (US); Subrata Mazumdar, Marlboro, NJ (US); Robert R Seibel, Waretown, NJ (US); TK Srinivas, Howell, NJ (US); Sriram Chittur Viswanathan, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1027 days.

(21) Appl. No.: 10/915,330

(22) Filed: Aug. 11, 2004

(65) Prior Publication Data

US 2006/0037063 A1   Feb. 16, 2006

(51) Int. Cl.
*G06F 9/00* (2006.01)
(52) U.S. Cl. .................. 713/155; 713/156; 713/161; 713/168; 713/175; 713/182
(58) Field of Classification Search .......... 713/155, 713/156, 161, 168, 175, 182
See application file for complete search history.

(56) References Cited

U.S. PATENT DOCUMENTS

| | | | | |
|---|---|---|---|---|
| 5,673,322 A | * | 9/1997 | Pepe et al. | 705/52 |
| 6,477,644 B1 | * | 11/2002 | Turunen | 713/161 |
| 6,560,217 B1 | * | 5/2003 | Peirce et al. | 370/351 |

* cited by examiner

*Primary Examiner*—Thomas R Peeso
(74) *Attorney, Agent, or Firm*—Muncy, Geissler, Olds & Lowe, PLLC

(57) ABSTRACT

A system for controlling network access to products. The system includes a security appliance connected to a product under operational control of a first entity, a product connection platform and a user terminal under operational control of a second entity, the product connection platform being accessed by the user terminal, and a trust relationship established between the first entity and the second entity based on predetermined criteria between the first entity and the second entity, the trust relationship being represented by a certificate or public/private key exchange. Authentication of access by a user of the user terminal of the second entity to the product of the first entity is deferred to the product connection platform of the second entity based on the predetermined criteria of the trust relationship, whereupon if authentication is granted, the user is provided access to the product.

21 Claims, 6 Drawing Sheets

SYSTEM AND METHOD FOR CONTROLLING NETWORK ACCESS

BACKGROUND OF THE INVENTION

1. Field of the Invention

The present invention relates to a System and Method for Controlling Network Access.

2. Description of the Relevant Art

In recent years, public and private enterprises of all sizes have installed an increasingly large array of telecommunications systems, information systems, and other products which serve as the operational infrastructure for day-to-day business activities.

However, providers of these products, systems, and services have long had issues concerning integrating with the access and authentication schemes of their customers' systems and equipment for providing testing, upgrades, and maintenance. In particular, these providers and servicing companies find it difficult to comply with a multitude of remote access requirements and differing remote access and authorization packages used by their customers. Moreover, managing all of the third party technicians, business partners and outsourcers that need remote access to products and systems used by an extended user base of customers is an issue terms of cost and resources.

Enterprise customers typically have Authentication/Authorization/Administration (AAA) servers located at their site to identify, control, log users.

AAA servers provide:
Authentication: the process of identifying and verifying a user.
Authorization: determines what a user can do
Administration: the action of recording what a user is doing or has done FIG. 1 shows a conventional Authentication/Authorization/Administration (AAA) Server 50 in the context of a representative customer network environment. FIG. 1 also illustrates customer VPN Gateway 51, and products 52, 53 (for example, PBXs).

Access by the Service Provider technician is accomplished by access device 40 via the Internet. Conventionally, customers requiring user authentication ask the Service Provider's technicians to use their Virtual Private Network (VPN) client (not shown) and their hard token, such as Secure ID. For a Service Provider having only a few service technicians, this may be a viable option. However, for a provider with hundreds or thousands of technicians, this becomes almost impossible.

Each service technician would need to install every customer's VPN client onto their PC. Since VPN clients typically modify the PC's TCPIP stack, the service provider's PC may no longer function properly.

Each technician would need to manage hundreds and possibly thousands of hard tokens for all the customers serviced. This would become un-manageable for both the provider and the customer. When customers are asked about this possibility, they agree a better solution is needed.

There is no requirement that a Service Provider open a trouble ticket or work ticket prior to authentication.

There are numerous companies such as RSA Security, Inc. and Ion Networks, Inc. that provide hard and soft token-based remote access control solutions. The solution works well for associates of a single company accessing their own devices. In an outsourced or third-party maintenance scenario it requires that the entire extended technician force, including all third-party technicians, be set up in the customer's access control system and assigned an individual hard or soft token. For the external maintenance company the requirement to keep up with a hard token device for each technician for each customer is a significant problem of cost and maintenance.

Companies such as Permeo Technologies, Inc. offer turnkey desktop to device authorization and remote access control solutions. This solution works well for associates of a single company accessing their own devices. It requires that all remote users purchase and use the exact same set of software and that the entire extended technician force, including all third-party technicians, be set up in the customer's access control system. This is a cost burden and for a third-party management company since it is not feasible to provide all the various configurations and software required for every customer's chosen turnkey solution to every technician.

The Liberty Alliance and Security Assertion Markup (no dash) Language (SAML) organizations are developing a trust based identity and authorization exchange standard for web-based business-to-business operations. This standard effort is focusing entirely upon web-based business-to-business transactions and applications. The protocols and access requirements for remote maintenance, monitoring and support extend far beyond web based access to applications.

The SOCKS Internet Request for Comments (RFC 1928, 3089 and 1929) provides a protocol for establishing access to network devices using a proxy service. The proxy service can implement access and authorization controls to devices behind the proxy. The current standards cover the use of user ID and password based authorization control as well as support for the Generic Security Services Application Programming Interface (GSSAPI) to allow additional authorization models to be established based upon the agreement of the client application and the proxy.

More information on these is described in:
Netegrity Role Management: http://www.netegrity.com/news/webseminararchive/rolesarchive.html
Permeo Outbound Access: http://www.permeo.com/outboundaccess.htm
ION Networks Secure remote access: http://www.ionnetworks.com/priisms.shtml Given the problems described above, what is needed going forward is a means to separate the three AAA functions so Authentication is performed at the Service Provider's site and the user's identity and associated roles is passed to the customer's site when access is requested. Authorization and Administration is then performed at the customer's site.

SUMMARY OF THE INVENTION

The present invention has as a primary object to improve on the systems and approaches of the background art and to solve of the drawbacks associated with the systems of the background art.

The solution proposed here is to extend the concept of SOCKS tunneling to include an authorization model based on an external trust relationship between two enterprises. The trust relationship is implemented using certificates.

SOCKS tunneling is when a SOCKS server, instead of a SOCKS client application, contacts another SOCKS server to establish a proxy connection to a device. There is no current Internet standard for SOCKS tunneling.

The authorization model is based upon a previously established trust relationship between two companies such that company A trusts company B to authenticate their own employees. Company A will not attempt to authenticate remote users from Company B. Instead Company A will authorize any remote access request made by an employee of company B. This authorization will be based on a set of identifying information sent through a secure channel as a part of the remote access request.

In operation, two companies will initially exchange certificates or public-key/private key pairs that represent the company's identity. The certificates will be used to establish the identity of each company when a remote access request is made. It is also used to establish a secure communication mechanism for exchanging the identity of the remote user making the request.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE INVENTION

The present invention provides an authorization model quite different from conventional systems and approaches.

The authorization model is based upon a previously established trust relationship between two companies such that Company A (for example, the customer) allows Company B (for example, the Service Provider) to authorize access to one of Company A's devices, only after Company B's system sends all the relevant employee identification to Company A.

Figure 1:
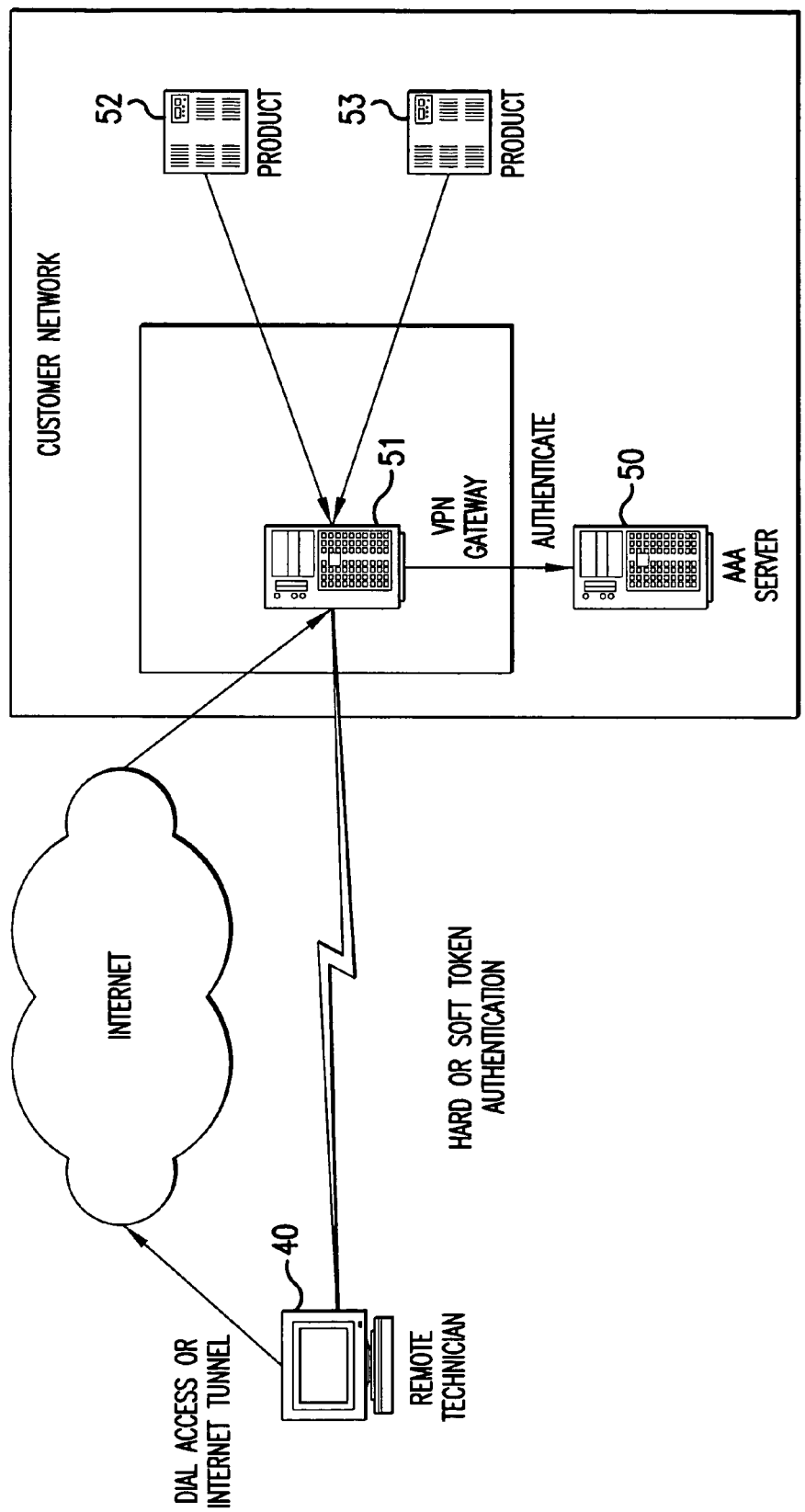
FIG. 1 shows a conventional Authentication/Authorization/Administration (AAA) Server in the context of a representative customer network environment.
Figure 2:
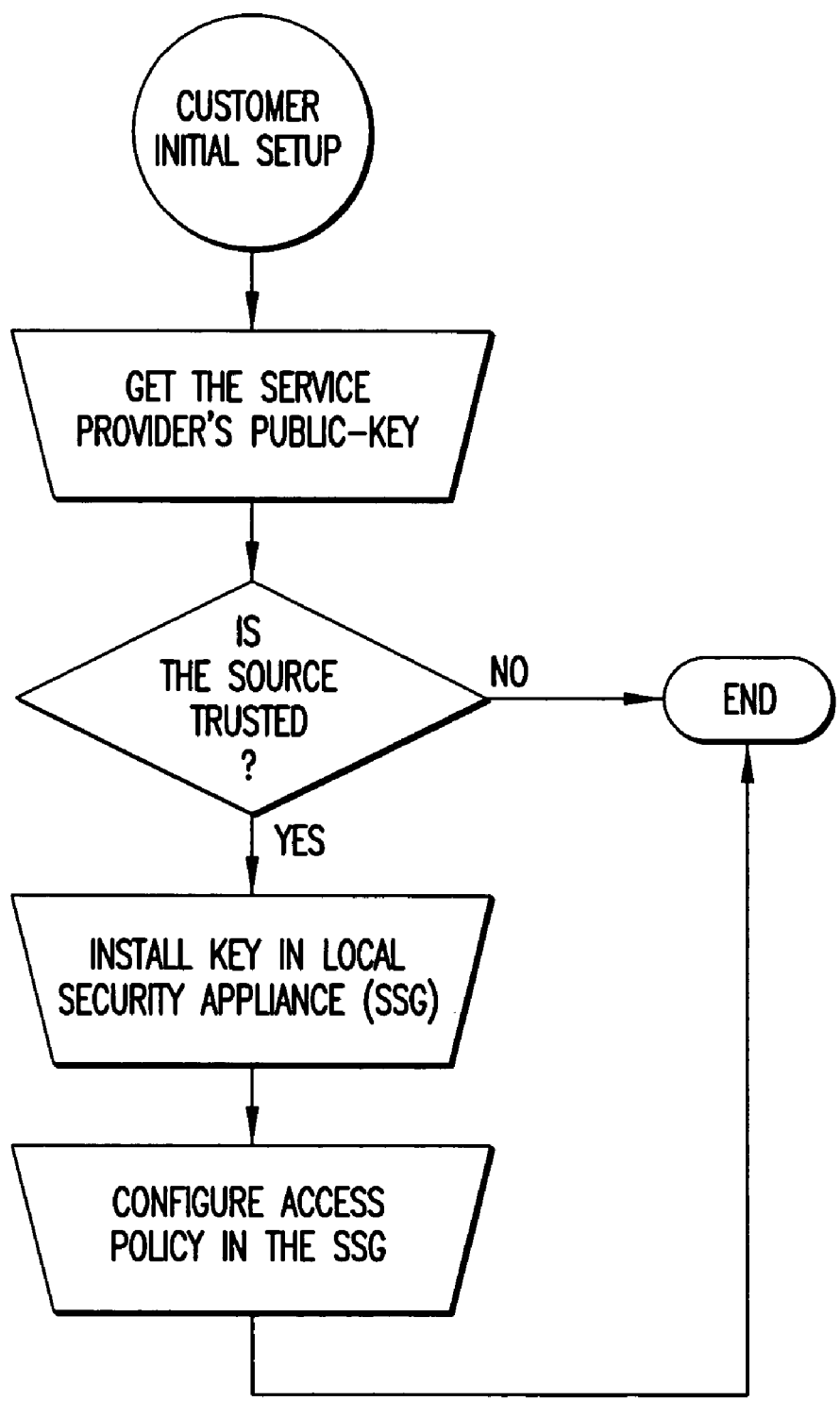
FIG. 2 is a flow chart diagram of the manual steps that occur in establishing the trust relationship between two companies.

Customer A initially establishes the trust relationship between the two companies by implementing the steps shown in FIG. 2. Once the trust relationship between the two companies has been established, remote access by Company B can take place.

Figure 3A:
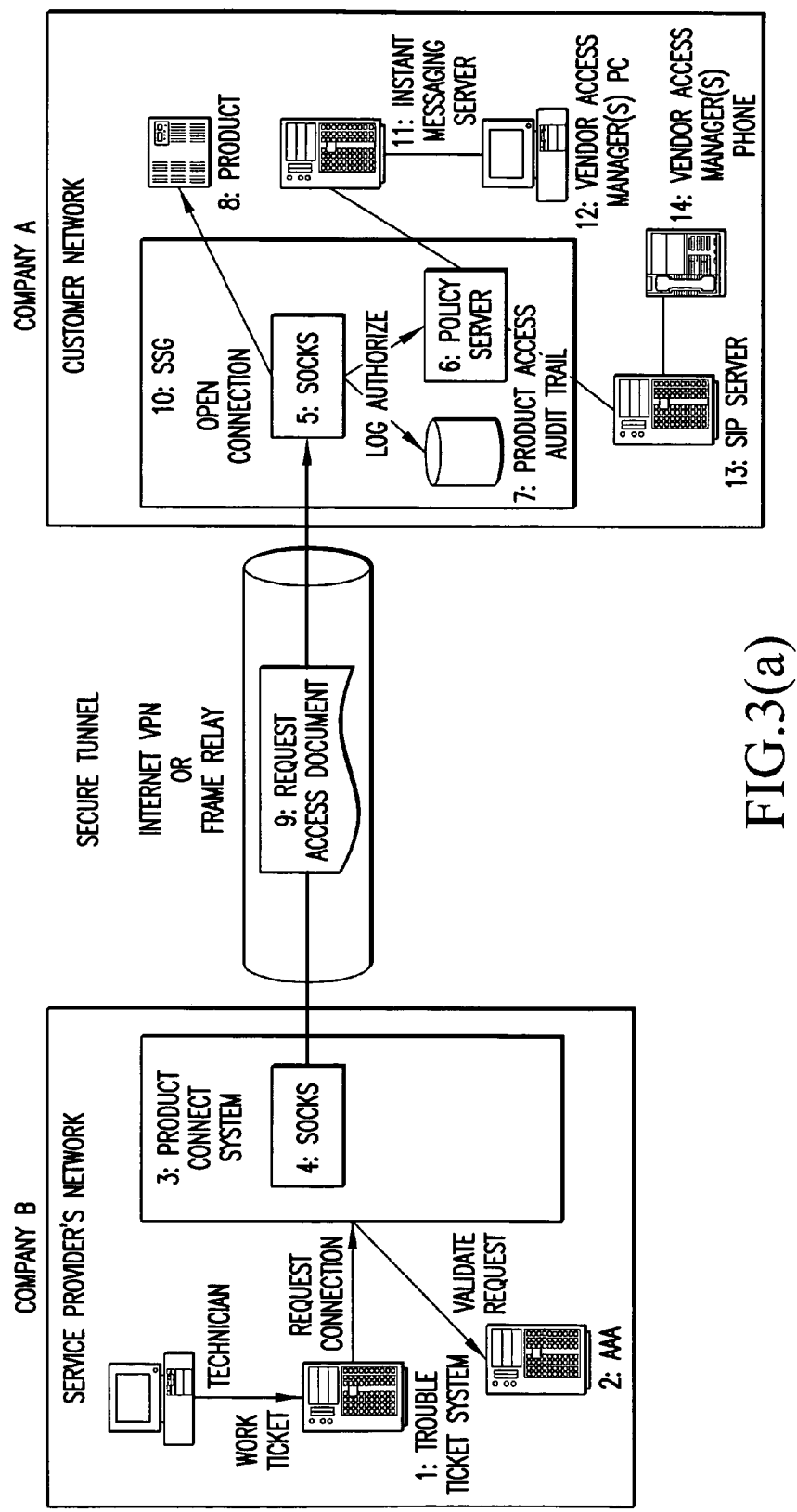
FIG. 3(a) shows the Authentication/Authorization/Administration (AAA) System of the present invention in the context of a representative customer network environment.

As shown in FIG. 3(a), Company A's environment includes a local gateway SSG 10 made up of a SOCKS server 5, policy server 6, and product access audit trail device 7. Product 8 (for example a PBX) is connected to local gateway SSG 10.

Company B's system includes product connect system 3, which is provided with SOCKS server 4, AAA system 4, and trouble ticketing system 1.

In operation, two companies will initially exchange certificates or public-key/private key pairs that represent the each company's identity. The certificates will be used to validate that any incoming requests originated from a trusted system. This exchange is illustrated with reference to the Company A and B environments shown in FIG. 3(a) and the sequence of messages shown in FIG. 3(b). Again, Company A is the user of some remotely serviceable product, such as a voice PBX switch, and Company B is the service provider for this system. Instead of checking the individual remote user's identity against a local authentication database the local gateway SSG 10 will check the companies certificate or credentials to validate that the incoming connection originated from a known and trusted system. The individual user's information will be passed as part of an encrypted packet that can be examined by the local gateway SSG 10 and the individual user's identity and other relevant information is logged by the SSG 10.

Figure 3B:
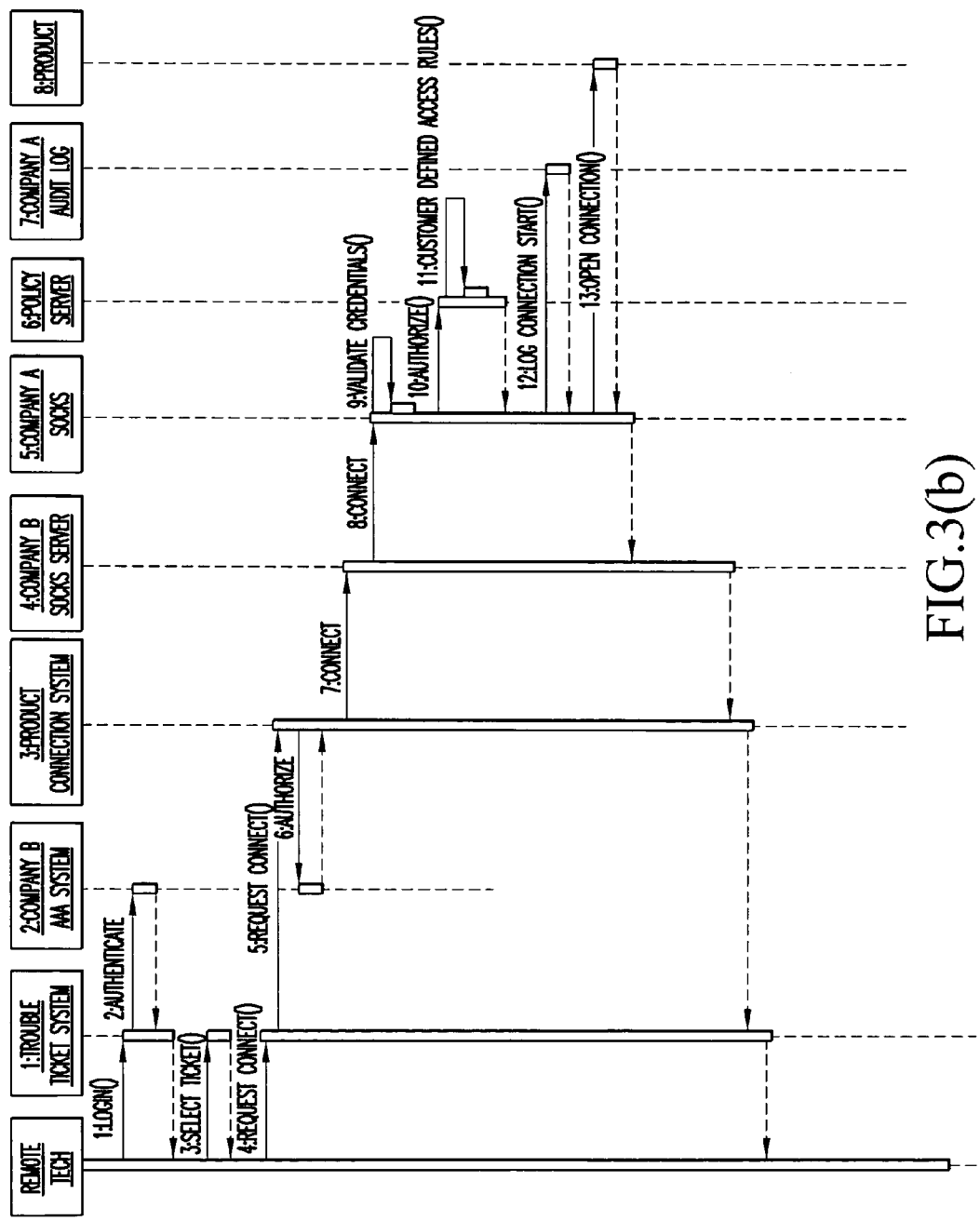
FIG. 3(b) is a sequence diagram highlighting the steps involved in the primary use of this invention.

Referring now to FIG. 3(b), when Company B's technician (user) attempts to connect to product 8 on Company A's network the following steps will occur:

Step 1: Company B.'s technician will login to the trouble ticketing system 1 via terminal 40.

Step 2: The technician will be authenticated by Company B's AAA service 2.

Step 3: The technician will select a ticket for service form trouble ticketing system 1.

Step 4: Company B's technician will request a connection to product 8 referenced in the ticket.

Step 5: The ticketing system 1 will call the product connect system 3 and request a connection.

Step 6: The product connect system 3 will contact Company B's AAA system (2) to determine if the technician has the appropriate authorizations to be granted the connection.

Step 7: Assuming authorization is granted the product connect system 3 will contact Company B's socks server 4 and request a connection to Company A's remote product 8. The technician's identity and trouble ticket information will be passed to the SOCKS server 4 along with the identifying information for product 8.

Step 8: Company B's SOCKS server 4 will create a secure connection with Company A's SOCKS server 5, running in the local gateway SSG 10, and send an authorization request document 9 containing all of the relevant information, including Company B's credentials, the technician's identity, product being accessed and the trouble ticket being worked.

Step 9: Company A's SOCKS server 5 will validate the credentials supplied to validate any identity of Company B.

Step 10: Company A's SOCKS server 5 will pass the access request document to the policy server 6, also running in the local gateway SSG 10 for processing.

Step 11: The policy server 6 will apply any customer defined access rules to the information supplied in name? access request document 9. The policy server 6 may specify that access to specific devices require on-site, real-time authorization by specific customer employees. The local gateway SSG 10 would then access the customer's Instant Messaging server 11 to notify those specific customer employees for authorization approval to access that product. The SSG 10 presents specific access attributes (trouble ticket number, product description, company and employee accessing product) to the customer employees for real-time authorization. One or more customer employees can "allow" or "deny" access. If any one customer employee says "deny", over a customer-specified time, access is denied. The reason can be supplied using the customer's Instant Messaging client. If all customer personnel say "allow", access is permitted. Other security parameters may be programmed providing the desired access policy.

The present invention is not limited to Instant Messaging types of real-time alerting as described above. An alternative solution to real-time authorization is using an SIP (Session Initiated Protocol) server 13 (shown in FIG. 3(*a*)) to communicate to customers using display phones 14 with a standard number pad. Here, the SSG's policy server 6 would call then send the access information to the customer's display phone 14 showing the name of the Service Provider's technician, the trouble ticket information, and/or the device requesting access, for example. The customer would then press either "1" for accept or "2" for deny. The SSG 10 would store the customer programmed access policy for each device managed. The device used by the customer to grant vendor access is not limited to phones or Instant Messaging service. Wireless devices like telephones, Personal Digital Assistants, Blackberry (http://www.blackberry.com/) devices, any local or remote communication client is included in this invention.

Step 12: The SOCKS server 5 will log all of the information in Company A's audit log 7, located on the SSG 10.

Step 13: Assuming authorization is granted, the SOCKS server 5 will open a connection to product 8. Control will then be returned to the technician. SOCKS server 5 would perform the necessary network address translation to address local devices.

Authentication Function and Process

The authentication function is provided by the interaction of two separate platforms, the service provider's service delivery platform located remotely from the customer site, and the local gateway/security appliance SSG located on or near the customer's premises. The SSG is controlled and monitored by the customer and not by the Service Provider.

The Service Provider must ensure that the service technician is authenticated before any access is permitted to the customer's site. This authentication process also assigns servicing "roles" to each individual technician. A role can be thought of as an individual service technician's "license" to provide service for a particular piece of customer equipment or system.

When access is needed, say as the result of a trouble ticket being created, an access request is first negotiated with the security appliance (SSG) local to the customer.

The access request contains attributes such as:

Service company name

Technician's name, roles, address

Technician manager's name, address and phone number

Product being accessed

Trouble Ticket number

On-site approval required.

A phone number(s), Instant Messenger name(s) or IP address(es) of the onsite person(s) giving the Service Provider access permission to their network.

Service provider internal transaction ID

The SSG is configured by the customer to allow technicians having specific roles to access their equipment and network. The access request by the service technician is securely sent to the SSG and compared to the access policy stored in the SSG. If the roles match, the user's identity and all other information in the access request is stored in the SSG's audit log. The access request can also be sent by the SSG to the customers Network Management System or Syslog Server giving them a real-time-access notification. As described here, access is allowed by role not by the user's identity, however the user's identity is also recorded for accountability purposes.

The authentication function and process may also permit the customer to build rules on other information in the identity packet. For example a "Deny By Name" rule could be built allowing a customer to deny specific service technicians (or any other user) from accessing their network. This may be the result of the customer's prior experience with a specific service technician or user. To provide this function, service company B would not have to send down to the SSG all of their technician's names. Rather, the SSG would store the names passed in the identity packet in the normal process of accessing products. This automatically populating name list would serve the basis for the exclude list. Using the SSG audit logs in forensic analysis, the customer would determine the person to exclude. The customer would then copy that name to the exclude list. When that person next tries to access any product, the SSG would then deny access by that person to any product. The SSG would also send a deny message in the SOCKS connection request back to the Company B SOCKS server stating the reason for denial.

Thus, the Authentication Function permits customer defined authorization checks.

Further, the Authentication Function could enable an "On-Site Approval Required" authorization model. For example, some customers may require the Service Provider to get real-time access permission in advance prior to connecting to their site. This entry would be passed to the SSG at the customer's site. The SSG security policy would send a message via an external notification service (described earlier) such as Instant Messaging, beeper, or email asking for customer authorization prior to allowing the technician (by name) to access that product. The SSG would provide the supporting access information so the customer can decide whether or not to allow access. Once that customer agent gives approval to the SSG, access by the service technician is allowed. The SSG would log all allow and deny access requests for future customer audits. This is important in the event an access is made by a vendor resulting in a service outage or security attacks on other customer servers. This log would help identify the vendor, the technician or vendor's automated tools causing the event.

Authorization Function and Process

Authorization is the process of making sure the user accesses only assigned resources. It usually occurs after the Authentication phase.

First, a brief description about a VPN client is provided. In the VPN connection process, a VPN client is remotely configured by the customer's VPN server to only access certain networks or IP addresses. The remote PCs IP parameters are changed to use and access resources on the remote network. For all practical purposes, the remote PC cannot access resources on the PC's local LAN. The PC is logically on the customer's network.

This is important, because, if a LAN-to-LAN connection is used instead of a VPN client to LAN connection, network address translation (NAT) is required to bridge the two different IP networks. It the customer's AAA server contains the allowed real IP addresses, the SSG would need to retrieve them from the AAA server and then map them to the Service Provider's internal address before access could be made.

To simplify this process, the SSG performs both the network address translation (NAT), Authorization and Administration functions.

Administration Function and Process

Administration is performed in the SSG after all Authentication and Authorization steps are complete.

If the customer has an external AAA server used for Administration (for example, a Remote Authentication Dial-In User Server (RADIUS) system using port 1813), the SSG could record the access request/result in the customer's server. This allows the customer to audit all access requests in one server.

Automated System Remote Access

The process described heretofore was initiated by a service technician. Alternatively, the system may be used to provide Automated Remote Access typically initiated by diagnostic computers.

The message flow during Automated System Remote Access is similar to the access by a remote technician, with the following exceptions. Each of Company B's automated system has its own unique identity and this identity will be validated by the Service Provider's systems, and then is provided to the customer's system. This is very important since the identity passed to the SSG is that of a diagnostic computer and not a technician. Instead of accessing the trouble ticketing system 1, the Automated System Remote Access application accesses the product connect system 3 directly supplying the appropriate ticketing information.

Access by a Local Technician

Figure 4A:
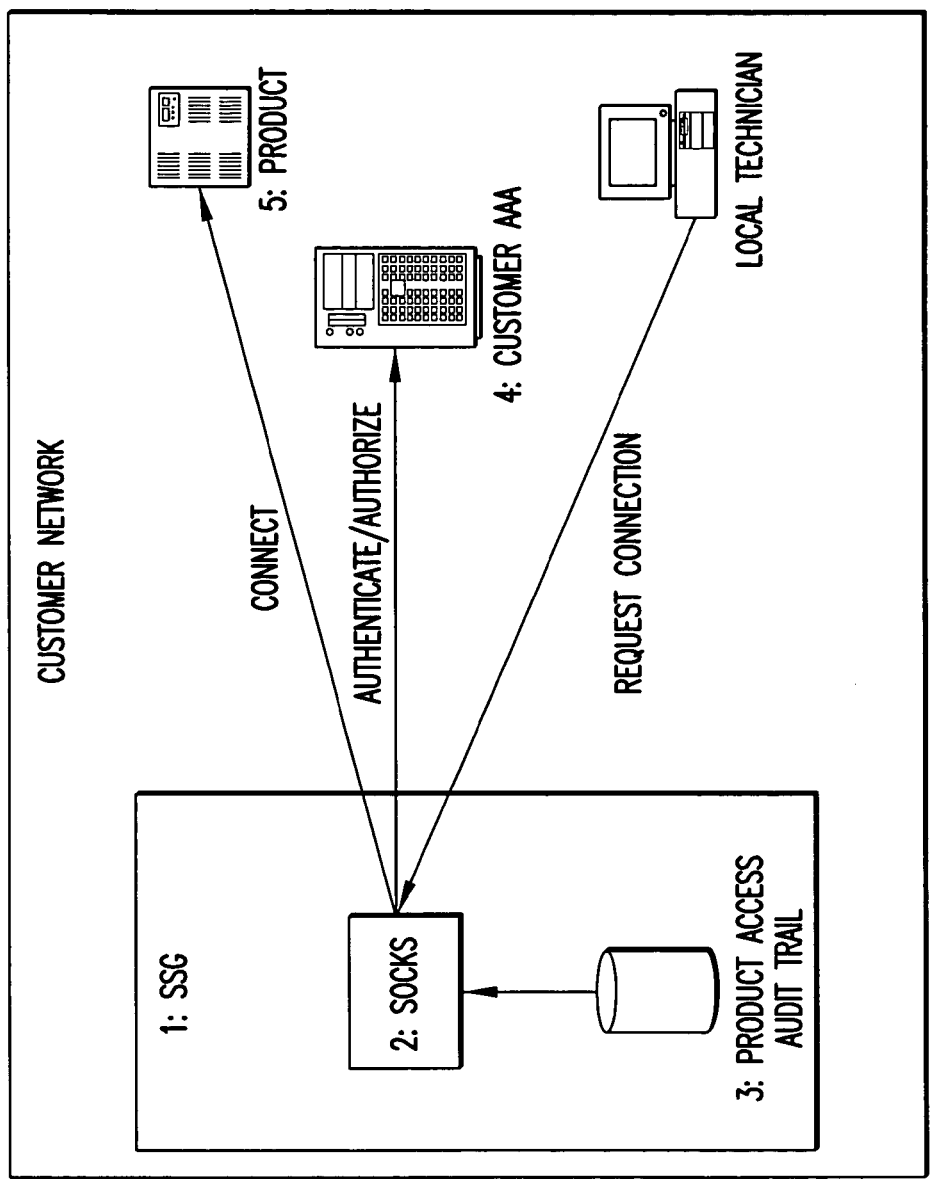
FIG. 4(a) shows the process for a service technician located at the customer site.
Figure 4B:
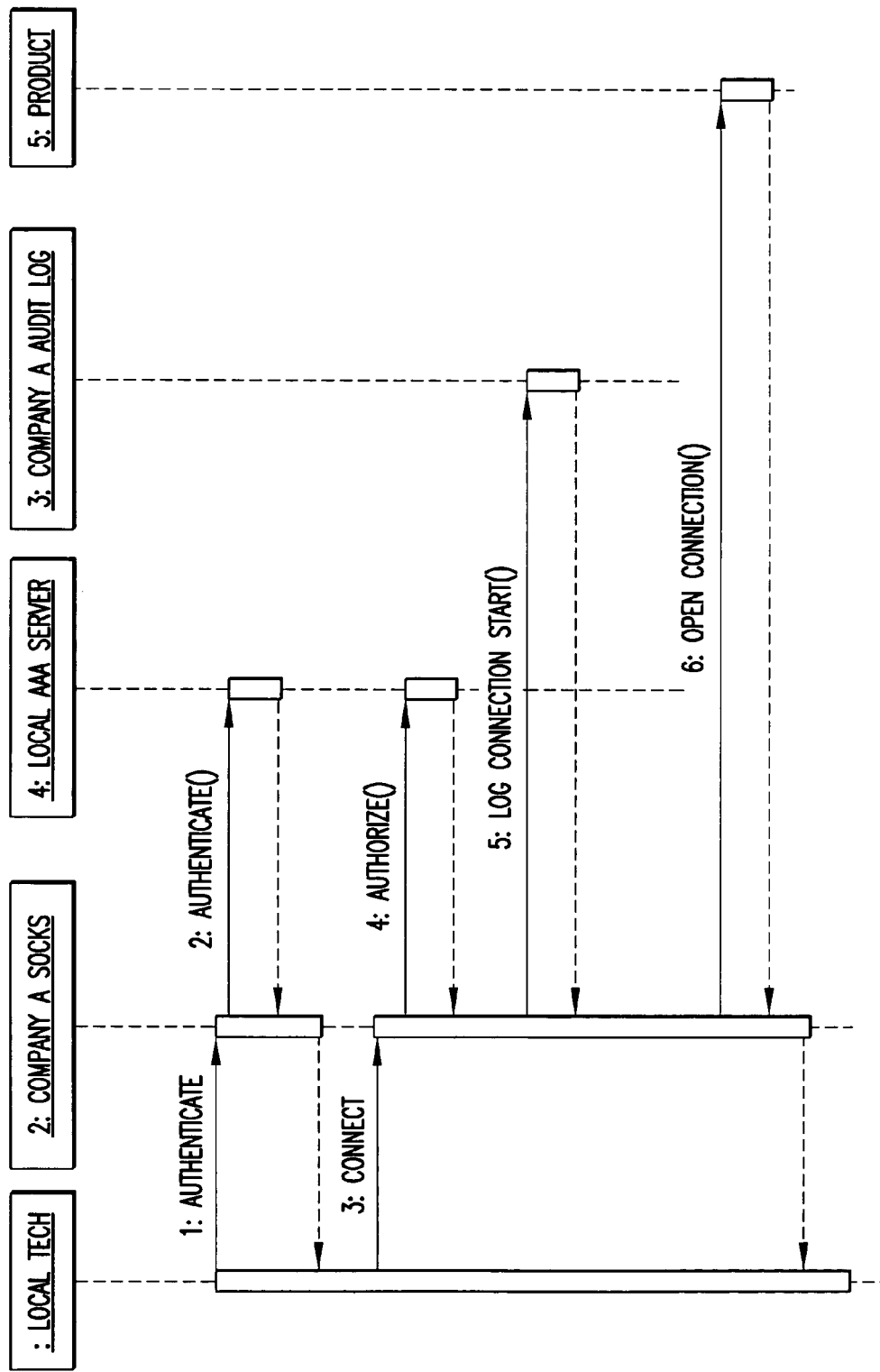
FIG. 4(b) is a sequence diagram highlighting the steps involved in this variation of the invention.

The message flow among the system components during Local Technician Access is shown by the arrows in FIG. 4(*a*). FIG. 4(*b*) provides a flow chart of the steps during Remote Technician Access.

A pre-requisite for local access by Company B's technician is that technician's PC must be SOCKSified. The SOCKS software must be configured to re-direct all traffic to the products being managed by the Company A's SSG 1 to the SOCKS server 2. Protocol between the SOCKSified client(s) and the SOCKS server is encrypted using SSL to maintain secure local access to the SSG.

The steps involved include the following:

Step 1: The local technician connects to the SOCKS server 2 running on the local SSG 1.

Step 2: The SOCKS server 2 authenticates the technician information against the customer's AAA server 4.

Step 3: The technician attempt to create a connection to product 5 using a local network address.

Step 4: The SOCKS server 2 checks the customer's AAA server 4 for authorization to access the product 5.

Step 5: The SOCKS server 2 logs of the connection request in the local audit log 3 of the SSG 1.

Step 6: The SOCKS server 2 opens a connection to product 5 and returns control back to Company A's local technician.

The invention described above provides a secure, integrated solution to the problems of conventional approaches. Advantages of this solution include:

It is no longer necessary for a Service Provider to maintain all third-party technician identities in a customer's access control system.

It is not necessary for every technician of each-third party maintenance, monitoring or support vendor to have the software or hard token that each and every customers may require in order to access their equipment.

The necessary information to comply with security and auditing procedures and legislation is maintained in secure fashion by both the Servicing Company and the customer using the equipment.

It is possible to build extremely granular access control rules without requiring extensive work by either the Service Provider or the customer. The identity information exchanged is sufficient to allow a customer of remote maintenance, monitoring or support to build granular and detailed access control records for access to their own devices without placing a burden upon Service Provider.

Other specific advantages include:

Authorization does not occur at the Service Provider's site, but rather at the customer's site.

A trouble/work ticket must first be created allowing IP access to the customer's site. The SSG located at the Service Provider's site prevents direct IP access to the customer's site. Access is rejected if the required information is not provided. This includes the Service Provider's identity, the identity of Service Provider's technician, and the trouble ticket being worked. A technician's company, technician's identity (or automated Expert System Identity), role, ticket number, and/or product IP address and "on-site approval required" is passed securely using the authorization request document to the onsite gateway SSG.

The customer retains on-site access control and does not need to trust the service provider for that control.

The customer has the ability to pre-program the onsite gateway with desired access control rules such as:
 i. Allowed time-of-day access
 ii. The allowed technician roles to access their products
 iii. The allowed products to access
 iv. The person(s) not allowed to access their products (from prior experience perhaps), and
 v. Persons permitted to give "on-site approval required".

The solution also allows for the integration with the customer's AAA database as a place to log transactions. Authentication is performed by the Service Provider's AAA system. Authorization is performed by the onsite gateway (SSG). Administration (logging) is optionally performed by the SSG or the customer's AAA server.

The customer's technician can use a standard SOCKS client to connect to the local products through the SSG. The SSG becomes the single gateway to access products.

This solution can use the customer's existing B2B connection. It does not require a separate VPN/Frame Relay connection for the service provider.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for controlling network access, comprising:
 a security appliance connected to a product under operational control of a first entity;
 a product connection platform and a user terminal under operational control of a second entity, the product connection platform being accessed by the user terminal;
 a trust relationship established between the first entity and the second entity based on predetermined criteria between the first entity and the second entity, the trust relationship being represented by a certificate or public/private key exchange,
 wherein authentication of access by a user of the user terminal of the second entity to the product of the first entity is deferred to the product connection platform of the second entity based on the predetermined criteria of the trust relationship, whereupon if authentication is granted, the user is provided access to the product.

2. The system for controlling network access according to claim 1, wherein the security appliance and product connection platform are separate from each other and connectable by a secure network connection, whereupon if the access is granted, the user terminal accesses the product over the secure connection.

3. The system for controlling network access according to claim 1, wherein the security appliance includes a first SOCKS server, a policy server, and a product access audit log.

4. The system for controlling network access according to claim 1, wherein the product connection system includes a second SOCKS server.

5. The system for controlling network access according to claim 1, wherein an authentication server and a trouble management system are connected to the product connection system.

6. The system for controlling network access according to claim 1, wherein the product connection system issues an access request, the access request including a trouble ticket number, an identifier of the product, and a role of the user.

7. The system for controlling network access according to claim 1, wherein the first entity and the second entity are the same.

8. The system for controlling network access according to claim 3, wherein the policy server may specify that access to the product requires real-time authorization.

9. A system for controlling network access, comprising:
a security appliance connected to a product under operational control of a first entity;
a user terminal under operational control of a second entity;
a trust relationship established between the first entity and the second entity based on predetermined criteria between the first entity and the second entity, the trust relationship being represented by a certificate or public/private key exchange,
wherein authentication of access by a user of the user terminal of the second entity to the product of the first entity is deferred to the user terminal of the second entity based on the predetermined criteria of the trust relationship, whereupon if authentication is granted, the user is provided access to the product.

10. The system for controlling network access according to claim 9, wherein the user terminal is provided with SOCKS software for communicating with the security appliance.

11. The system for controlling network access according to claim 9, wherein the security appliance includes a first SOCKS server, a policy server, and a product access audit log.

12. The system for controlling network access according to claim 9, wherein the user terminal issues an access request, the access request including a trouble ticket number, an identifier of the product, and a role of the user.

13. The system for controlling network access according to claim 11, wherein the policy server may specify that access to the product requires real-time authorization.

14. A method for controlling network access, comprising the steps of:
establishing a trust relationship between a first and a second entity that is represented by a certificate or public/private key exchange;
a user of the second entity requesting access to a product of the first entity;
deferring to the second entity authentication of the user requesting access to the first entity;
providing access by the user of the second entity to the product of the first entity if authentication is granted,
wherein authentication of the access is granted based on predetermined criteria of the trust relationship.

15. The method for controlling network access according to claim 14, further comprising the step of:
creating and sending an access request to a security appliance of the first entity.

16. The method for controlling network access according to claim 14, further comprising the step of sending the access request over a secure network connection to a SOCKS server.

17. The method for controlling network access according to claim 14, further comprising the steps of:
authorizing and administering access at the local network gateway based upon the predetermined criteria, the predetermined criteria including a user identity, a trouble ticket number and an identity of the product to be accessed.

18. The method for controlling network access according to claim 14, wherein the predetermined criteria may be dynamically controlled by the first entity.

19. The method for controlling network access according to claim 14, further comprising the steps of:
granting authentication on a real-time basis.

20. A method of controlling access by agents of a first entity to a product located on a network of a second entity comprising:
providing a product connection platform controlled by the first entity;
providing a security appliance controlled by the second entity and connected to the product;
establishing a connection between the product connection platform and the security appliance;
establishing a trust relationship between the product connection platform and the security appliance;
authenticating agents of the first entity to the product connection platform; and
providing access to the product by agents of the first entity via the product connection platform and the security appliance the based on the establishment of the trust relationship.

21. The method of claim 20 including the additional steps of maintaining a list of excluded agents at the security appliance and prohibiting access to the network of the second entity by agents of the first entity on the list of excluded agents.

* * * * *